US010449728B2

(12) United States Patent
Fontanazzi (10) Patent No.: US 10,449,728 B2
(45) Date of Patent: Oct. 22, 2019

(54) FORMING ASSEMBLY AND METHOD FOR FORMING A PLURALITY OF SEALED PACKS FOR POURABLE FOOD PRODUCTS STARTING FROM A TUBE OF PACKAGING MATERIAL

(71) Applicant: Tetra Laval Holdings & Finance S.A., Pully (CH)

(72) Inventor: Paolo Fontanazzi, Modena (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 15/542,730

(22) PCT Filed: Feb. 2, 2016

(86) PCT No.: PCT/EP2016/052112
§ 371 (c)(1),
(2) Date: Jul. 11, 2017

(87) PCT Pub. No.: WO2016/124559
PCT Pub. Date: Aug. 11, 2016

(65) Prior Publication Data
US 2017/0355477 A1 Dec. 14, 2017

(30) Foreign Application Priority Data
Feb. 4, 2015 (EP) .................................. 15153728

(51) Int. Cl.
*B65B 51/30* (2006.01)
*B65B 61/28* (2006.01)
(Continued)

(52) U.S. Cl.
CPC .......... *B29C 66/8351* (2013.01); *B29C 65/02* (2013.01); *B29C 66/4312* (2013.01);
(Continued)

(58) Field of Classification Search
CPC ....... B65B 51/30; B65B 51/306; B65B 9/067; B65B 9/087; B65B 9/20; B65B 9/22;
(Continued)

(56) References Cited

U.S. PATENT DOCUMENTS 3,388,525 A * 6/1968 Thesing .................... B65B 9/12
53/374.6
4,073,121 A * 2/1978 Greenawalt ............. B29C 65/10
53/511
(Continued)

FOREIGN PATENT DOCUMENTS

CN 1176915 A 3/1998
DE 2612710 A1 * 10/1976 ............... B65B 9/12
(Continued)

OTHER PUBLICATIONS

European Search Report and Written Opinion in corresponding PCT Application PCT/EP2016/052112 dated Apr. 25, 2016 (13 pages).

*Primary Examiner* — Stephen F. Gerrity
*Assistant Examiner* — Joshua G Kotis
(74) *Attorney, Agent, or Firm* — Finnegan, Henderson, Farabow, Garrett & Dunner LLP (57) ABSTRACT

There is described a forming assembly (10*a*, 10*b*) for forming a plurality of sealed packs (3) starting from a tube (2) of packaging material, comprising: a track (13*a*, 13*b*); a first element (15*a*, 15*b*), which is cyclically movable along the track (13*a*, 13*b*) and comprises, in turn, one of a sealing element (22*b*) or a counter-sealing element (22*a*) adapted to seal the pack (3); and a second element (14*a*, 14*b*), which is cyclically movable along the track (13*a*, 13*b*) and comprises, in turn, a first half-shell (21*a*, 21*b*; 21*a'*, 21*b'*) adapted, in use, contact the tube (2) so as to bound at least part of a respective pack (3) and control the shape of the pack (3) during the formation thereof; the first element (15*a*, (Continued)

15b) and the second element (14a, 14b) are self-movable along the track (13a, 13b) independently of one another.

25 Claims, 6 Drawing Sheets

(51) Int. Cl.
| | |
|---|---|
| *B29C 65/00* | (2006.01) |
| *B65B 9/20* | (2012.01) |
| *B29C 65/02* | (2006.01) |
| *B65B 61/24* | (2006.01) |
| *B65B 9/12* | (2006.01) |
| *B29C 65/36* | (2006.01) |
| *B29C 65/74* | (2006.01) |
| *B29L 31/00* | (2006.01) |

(52) U.S. Cl.
CPC ...... *B29C 66/83513* (2013.01); *B29C 66/849* (2013.01); *B29C 66/84123* (2013.01); *B65B 9/12* (2013.01); *B65B 9/2042* (2013.01); *B65B 9/2049* (2013.01); *B65B 51/303* (2013.01); *B65B 51/306* (2013.01); *B65B 61/24* (2013.01); *B65B 61/28* (2013.01); *B29C 65/3656* (2013.01); *B29C 65/7451* (2013.01); *B29C 66/1122* (2013.01); *B29C 66/71* (2013.01); *B29C 66/72321* (2013.01); *B29C 66/72328* (2013.01); *B29C 66/81457* (2013.01); *B29C 66/82263* (2013.01); *B29L 2031/7166* (2013.01)

(58) Field of Classification Search
CPC ..... B65B 9/2049; B65B 9/2035; B65B 9/207; B65B 9/12; B29C 66/8351–83533; B29C 66/8491
USPC .......................................... 53/451, 551, 552
See application file for complete search history.

(56) References Cited

U.S. PATENT DOCUMENTS

| | | | | |
|---|---|---|---|---|
| 4,133,162 | A * | 1/1979 | Baunnstingl | B65B 9/12 53/450 |
| 4,450,669 | A * | 5/1984 | Rapparini | B65B 9/12 53/551 |
| 5,001,891 | A * | 3/1991 | Abate | B29C 65/18 156/583.5 |
| 5,031,386 | A * | 7/1991 | Schneider | B29C 65/18 53/370.7 |
| 5,965,963 | A * | 10/1999 | Chitayat | H02K 41/031 310/12.01 |
| 5,967,961 | A * | 10/1999 | Leijon | B29C 65/02 493/205 |
| 5,970,687 | A * | 10/1999 | Katayama | B65B 9/20 53/451 |
| 6,388,071 | B2 | 5/2002 | Mahaney | |
| 6,625,517 | B1 * | 9/2003 | Bogdanov | B29C 65/02 324/207.21 |
| 6,876,107 | B2 * | 4/2005 | Jacobs | B60L 15/38 310/12.19 |
| 6,876,896 | B1 * | 4/2005 | Ortiz | B29C 65/02 318/135 |
| 7,441,391 | B2 * | 10/2008 | Lopparelli | B29C 65/02 53/374.6 |
| 2003/0230941 | A1 | 12/2003 | Jacobs | |
| 2005/0138899 | A1 * | 6/2005 | Draisey | A61J 3/07 53/454 |
| 2015/0336691 | A1 * | 11/2015 | Fowler | B29C 51/20 206/524.7 |

FOREIGN PATENT DOCUMENTS

| | | |
|---|---|---|
| EP | 0 401 422 | 12/1990 |
| EP | 0 887 265 | 11/2002 |
| WO | WO 00 64741 | 11/2000 |
| WO | WO 01 02249 | 1/2001 |

* cited by examiner

FORMING ASSEMBLY AND METHOD FOR FORMING A PLURALITY OF SEALED PACKS FOR POURABLE FOOD PRODUCTS STARTING FROM A TUBE OF PACKAGING MATERIAL

This is a National Phase of PCT Application No. PCT/EP2016/052112, filed Feb. 2, 2016, which claims the benefit of EP Application No. 15153728.9 filed Feb. 4, 2015, which is incorporated herein by reference.

TECHNICAL FIELD

The present invention relates to a forming assembly and to a method for forming a plurality of sealed packs for pourable food products starting from a tube of packaging material.

BACKGROUND OF INVENTION

As is known, many liquid or pourable food products, such as fruit juice, UHT (ultra-high-temperature treated) milk, wine, tomato sauce, etc., are sold in packages made of sterilized packaging material.

A typical example is the parallelepiped-shaped package for liquid or pourable food products known as Tetra Brik Aseptic (registered trademark), which is made by folding and sealing laminated strip packaging material. The packaging material has a multilayer structure comprising a base layer, e.g. of paper, covered on both sides with layers of heat-seal plastic material, e.g. polyethylene. In the case of aseptic packages for long-storage products, such as UHT milk, the packaging material also comprises a layer of oxygen-barrier material, e.g. an aluminium foil, which is superimposed on a layer of heat-seal plastic material, and is in turn covered with another layer of heat-seal plastic material forming the inner face of the package eventually contacting the food product.

Packages of this sort are normally produced on fully automatic packaging units, on which a continuous tube is formed from the web-fed packaging material; the web of packaging material is sterilized on the packaging unit, e.g. by applying a chemical sterilizing agent, such as a hydrogen peroxide solution, which, once sterilization is completed, is removed from the surfaces of the packaging material, e.g. evaporated by heating; the web so sterilized is then maintained in a closed, sterile environment, and is folded and sealed longitudinally to form a tube, which is fed along a vertical advancing direction.

In order to complete the forming operations, the tube is filled with the sterilized or sterile-processed food product, and is sealed and subsequently cut along equally spaced transversal cross sections.

Pillow packs are so obtained, which have a longitudinal sealing band and a pair of top and bottom transversal sealing bands.

Packaging units are known, as described for example in European Patent EP-B-0887265, which comprise two chain conveyors defining respective endless paths.

In greater detail, the first conveyor is fitted with a plurality of first jaws, each comprising a respective sealing element and a respective extractable cutting element.

The second conveyor is fitted with a plurality of second jaws, each associated to a relative first jaw and comprising a respective counter-sealing element and a respective seat.

In particular, each sealing element is a heating element and corresponding counter-sealing element is made of elastomeric material, which provides the necessary mechanical support to grip the tube to the required pressure.

The paths of the chain conveyors comprise:
respective operative branches substantially facing and parallel to each other, and between which the tube of packaging material is fed, so that the first jaws cooperate with the second jaws on the other conveyor to grip the tube at a number of successive cross sections and to heat-seal the tube and cut the packs; and
respective return branches, along which the first jaws and the second jaws are spaced apart from the tube.

In greater detail, the first jaws and the corresponding second jaws at first move away from each other and then move towards each other, as they move along return branches downstream of the operative branches with respect to the advancing direction of the chain conveyors.

As each first jaw cooperates with the corresponding second jaw along the operative branches, the respective sealing element cooperates with the respective counter-sealing element to heat-seal the tube at a corresponding transversal section.

Furthermore, as each first jaw cooperates with the corresponding second jaw, the respective cutting element is extracted to cut the formed sealed packs at the transversal section, so as to form corresponding sealed packages.

Each first jaw and second jaw also comprises respective forming half-shells, which are hinged with respect to the relative sealing element or the counter-sealing element, so as to control the volume of the relative packs in formation.

The half-shells of each first jaw and of the corresponding second jaw move cyclically between:
an open position, in which they are detached from the tube; and
a closed position, in which they contact the tube and fold the portion of the tube between two consecutive sealing sections to define and control the volume of the packs being formed.

In this way, as the sealing element of each first jaw seals the pack in formation, the half-shells of the same first jaw and of the corresponding second jaw control the volume of the pack in formation.

Furthermore, each first jaw comprises a pair of lateral fingers, which are arranged immediately above the sealing element.

The fingers are adapted to pull down the tube when the half-shells are closing on the tube, so as to arrange the tube in a desired position with respect to the sealing element of the same first jaw.

In this way, it is ensured that the packs are transversally sealed in the desired position with respect to the images repeatedly printed on the packaging material forming the tube. The images must be arranged in given position with respect to the transversal sealed sections of the formed packs.

Furthermore, it is important to consider that the pack comprises a substantially parallelepiped main portion and a pair of opposite trapezoidal fins projecting from the main portion. Each fin comprises a pair of opposite triangular flaps, which laterally extends beyond the main portion on respective opposite lateral sides.

In order to correctly form the packs, the fingers press and fold the triangular flaps orthogonally to the axis of the tube and on the sealing element of the relative first jaw, when the latter cooperates with relative second jaw.

In other words, as the tube is constrained by the first jaw and second jaw cooperating with one another the fingers fold the triangular flaps, thus completing the formation of the relative pack.

More specifically, the half-shells may be spring-loaded by respective springs into the respective open position, and have respective rollers, which cooperate with respective cams designed to move the half-shells into the respective closed position by the time the forming assembly reaches a predetermined position as it moves down.

Each half-shell has a C-shaped cross section, and comprises, integrally: a main wall, and two parallel lateral flaps projecting towards the axis of the tube of packaging material from respective opposite end edges of the main wall.

In the closed position, the main walls are located on opposite sides of the tube axis, are parallel to each other, and cooperate with respective first portions of the tube.

In the closed position, the flaps of one half-shell cooperate with respective second portions of the tube to completely control the volume of the pack being formed, and, on the opposite side to the relative main wall, face corresponding flaps of the other half-shell.

Finally, the packaging unit comprises a pair of fixed cam assemblies arranged on respective sides of the tube.

The cam assemblies cooperate in rolling manner with respective rollers carried by the first jaws and the second jaws.

The profiles of the cam assemblies are so designed to move the first jaws and the second jaws along the respective return branches and operative branches, and to ensure the smoothest transition between the various positions assumed by the first jaws and the second jaws, so as to prevent undesired stress on the materials.

Though performing excellently on the whole, the packaging units of the type described still leave room for further improvement.

In particular, it has been proposed, in the embodiment shown in FIG. 17 of WO00/64741, to replace the conveyor chains with:
- a first track and a second track, which are arranged on respective opposite lateral sides of the tube; and
- a plurality of first carriages self-movable on the first track and a plurality of respective second carriages movable on the second track.

In particular, the first carriages are movable independently of one another along the first track and the second carriages are movable independently of one another along the second track.

Each first carriage is fitted with a relative sealing element and a relative half-shell, while each corresponding second carriage is fitted with a respective counter-sealing element and with a relative half-shell.

Being the first carriage and the respective second carriage movable independently from one another, it is no longer necessary to provide the cumbersome chain conveyors.

However, the packaging unit shown in FIG. 17 of WO00/64741 leaves room for improvement, especially as regards to the precise and repeatable sealing of the pillow packs in the desired position.

As a matter of fact, the packaging unit shown in FIG. 17 of WO00/64741 fails to disclose any solution for the folding of the triangular top flaps of the packs in formation.

A need is therefore felt within the industry to improve the precision and the repeatability with which the tube is arranged in the desired position with respect to the sealing element and counter-sealing element.

Furthermore, the solution shown in FIG. 17 of WO00/64741 leaves room for improvement, especially as regard to the possibility of forming sealed packs having different height and the diameter varying in a narrow range, without wholly re-designing the packaging unit.

As a matter of fact, in order to adjust the height of the formed sealed packs, it is necessary to replace the whole first carriages and second carriages with differently-sized ones that fit with the new packs.

A need is felt within the industry to improve the flexibility of the packaging units, with respect to the possibility of forming sealed packs having different heights and with diameter varying in a narrow range.

DISCLOSURE OF INVENTION

It is therefore an object of the present invention to provide a forming assembly for forming a plurality of sealed packs for pourable food products starting from a tube of packaging material, which meets at least one of the above-identified needs.

According to the present invention, there is provided a forming assembly for forming a plurality of sealed packs for pourable food products starting from a tube of packaging material.

The present invention also relates to a method for forming a plurality of sealed packs for pourable food products starting from a tube of packaging material.

BRIEF DESCRIPTION OF THE DRAWINGS

One preferred, non-limiting embodiments of the present invention will be described by way of example with reference to the accompanying drawings, in which.

DETAILED DESCRIPTION OF PREFERRED EMBODIMENTS

With reference to FIGS. 1 to 7, number 1 indicates as a whole a packaging unit for producing sealed packs 3 of a pourable food product, such as pasteurized milk or fruit juice, from a tube 2 of sheet packaging material.

The packaging material has a multilayer structure (not shown), and comprises a layer of fibrous material, normally paper, covered on both sides with respective layers of heat-seal plastic material, e.g. polyethylene.

In the case of aseptic packages for long-storage products, such as UHT milk, the packaging material also comprises a layer of gas- and light-barrier material, e.g. aluminium foil or ethylene vinyl alcohol (EVOH) film, which is superimposed on a layer of heat-seal plastic material, and is in turn covered with another layer of heat-seal plastic material forming the inner face of the package eventually contacting the food product.

Tube 2 is formed in known manner by longitudinally folding and sealing a web (not shown) of heat-seal sheet material, is filled by a pipe (not shown) with the sterilized or sterile-processed food product for packaging, and is fed, in known manner not shown, along a vertical path having an axis A.

Axis A is vertical in the embodiment shown.

It is also possible to identify:
a direction B, which is orthogonal to axis A and horizontal in the embodiment shown; and
a direction C, which is orthogonal to both axis A and direction B and is horizontal in the embodiment shown.

In greater detail, unit 1 comprises:
a pair of forming assemblies 10a, 10b, which are arranged on respective lateral sides with respect to axis A and are spaced apart with respect to one another along direction B, and which are adapted to interact with tube 2, so as to form a number of pillow packs 3 separated from one another; and
an outlet conveyor 11, which is arranged below forming assembly 10a, 10b and is staggered from axis A along direction B, and which is adapted to receive formed packs 3 discharged by forming assembly 10b.

Forming assemblies 10a, 10b interact with tube 2 to heat seal it at equally spaced cross sections and form a number of pillow packs 3 (FIG. 1) connected to tube 2 by transversal sealing bands crosswise to axis A.

Furthermore, forming assemblies 10a, 10b interact with tube 2 to cut pillow packs 3 along respective sealing bands, so as to separate pillow pack 3 from one another.

Outlet conveyor 11 conveys packs 3 towards a not-shown folding unit, in which packs 3 are folded into corresponding not-shown packages.

Forming assembly 10a substantially comprises:
a frame 12a, which defines a plurality, two in the embodiment shown, of tracks 13a spaced along direction C with respect to one another; and
a plurality of groups of carriages 14a', 15a, 14a consecutive and immediately adjacent to one another.

Forming assembly 10b substantially comprises:
a frame 12b, which defines a plurality, two in the embodiment shown, of tracks 13b spaced along direction C with respect to one another; and
a plurality of groups of carriages 14b', 15b, 14b consecutive and immediately adjacent to one another.

Each frame 12a, 12b comprises:
two oval planar end surfaces 16a, 16b opposite to another, lying on respective planes parallel to axis A and vertical in the embodiment shown; and
a curved continuous surface 17a, 17b, which extends between surfaces 16a, 16b along a direction B, orthogonal to axis A.

Furthermore, each track 13a, 13b comprises (FIG. 3):
a rectilinear portion 18a, 18b, which extends parallel to axis A and faces tube 2;
a rectilinear portion 19a, 19b, which extends parallel to axis A and is opposite to respective portion 18a, 18b; and
a pair of curved portions 20a, 20b, which are interposed between portions 18a, 18b; and 19a, 19b.

Each carriage 14a, 14a' of forming assembly 10a is associated to a corresponding carriage 14b, 14b' of forming assembly 10b.

In the very same way, each carriage 15a of forming assembly 10a is associated to a corresponding carriage 15b.

Each pair of corresponding carriages 14a, 14b (or 14a', 14b') and the pair of immediately precedent and subsequent carriages 15a, 15b form and seal a relative pack 3.

In the following of the present description, only one group of corresponding carriages 14a', 15b, 14a and the respective group of corresponding carriages 14b', 15b, 15a will be described, being all the carriages 14a', 14b'; 15a, 15b; 14a, 14b identical to one another.

Each carriage 14a', 14a and corresponding carriage 14b', 14b comprises respective half-shells 21a', 21a; 21b', 21b.

In detail, half-shell 21a, 21b; 21a', 21b' has a C-shaped cross section and comprises (FIGS. 2, 4 and 6):
a main wall 28; and
a pair of lateral flaps 29, which project from wall 28 towards axis A from respective opposite edges of wall 28 and are hinged to respective opposite edges of wall 28 about respective axes.

Carriage 15b comprises a sealing element 22b and an extractable cutting element 23b.

Corresponding carriage 15a comprises a counter-sealing element 22a and a not-shown seat, which is adapted to receive cutting element 23b, when the latter is extracted.

In the embodiment shown, sealing elements 22b are heating elements. Counter-sealing elements 22a are made of elastomeric material, which provides the necessary mechanical support to grip tube 2 to the required pressure.

Advantageously, carriages 14a', 14b'; 14a, 14b and carriages 15a, 15b are self-movable on respective tracks 13a, 13b independently from one another.

In this way, half-shells 21a'; 21a and counter-sealing elements 22a of forming assembly 10a are movable independently of one another.

Half-shells 21b'; 21b and sealing elements 22b are movable independently of one another.

Figure 1:
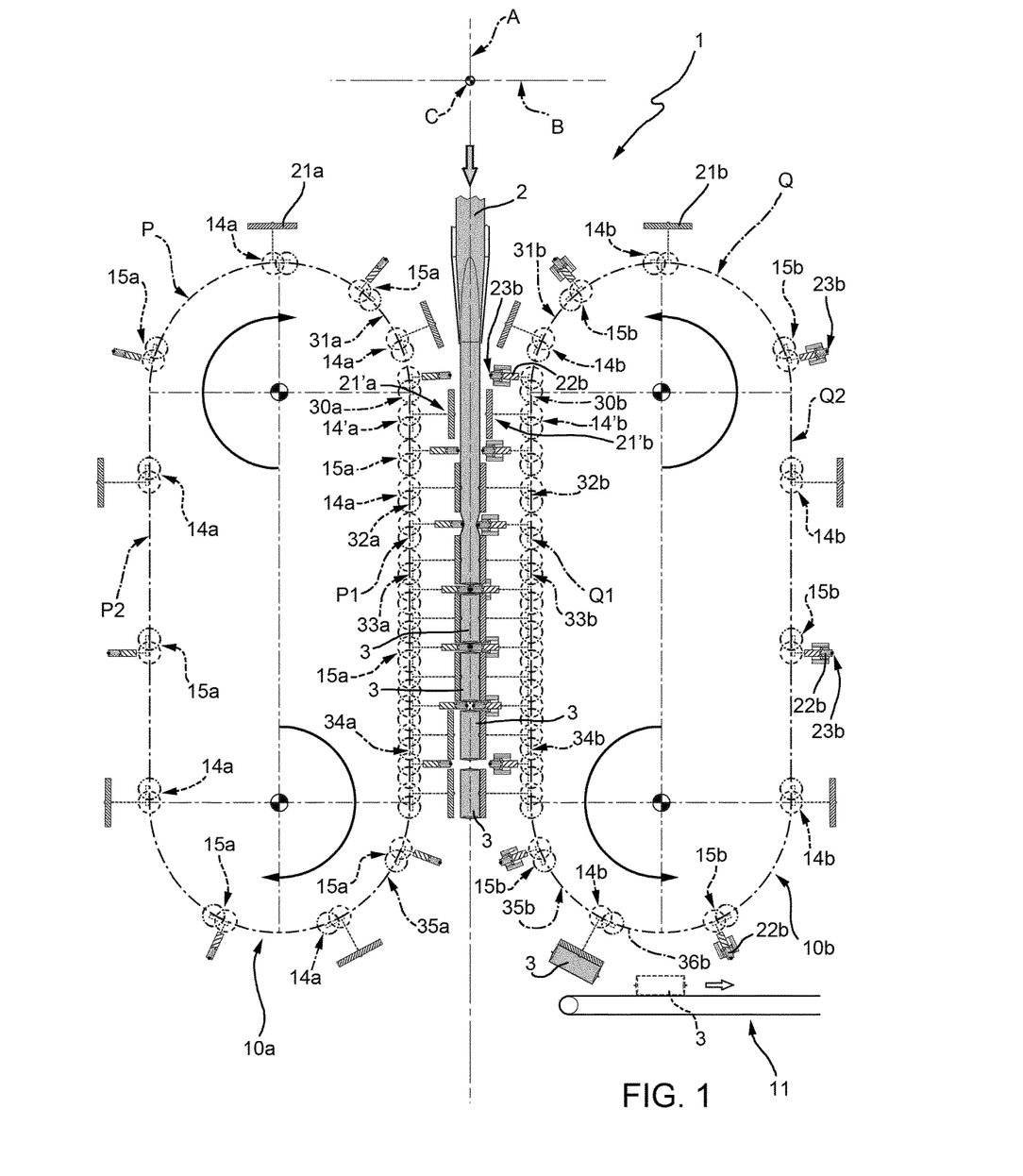
FIG. 1 is a frontal view of a packaging unit for forming a plurality of sealed packages comprising a pair of forming assemblies according to the present invention.
Figures 2, 5:
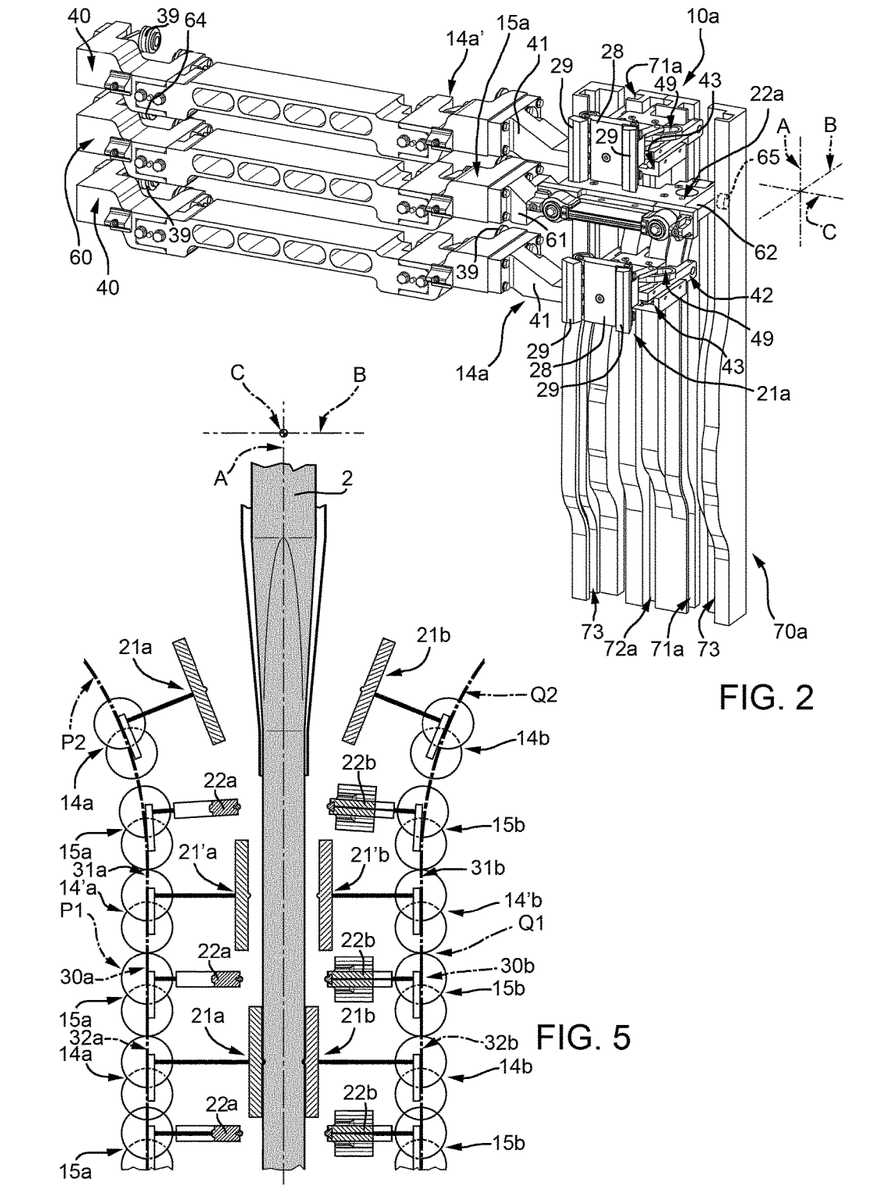
FIG. 2 shows, in an enlarged view, first components of the packaging unit of FIG. 1, with parts removed for clarity.
FIG. 5 is a schematic view of different operative position of the packaging unit of FIGS. 1 to 4, with parts removed for clarity.
Figure 3:
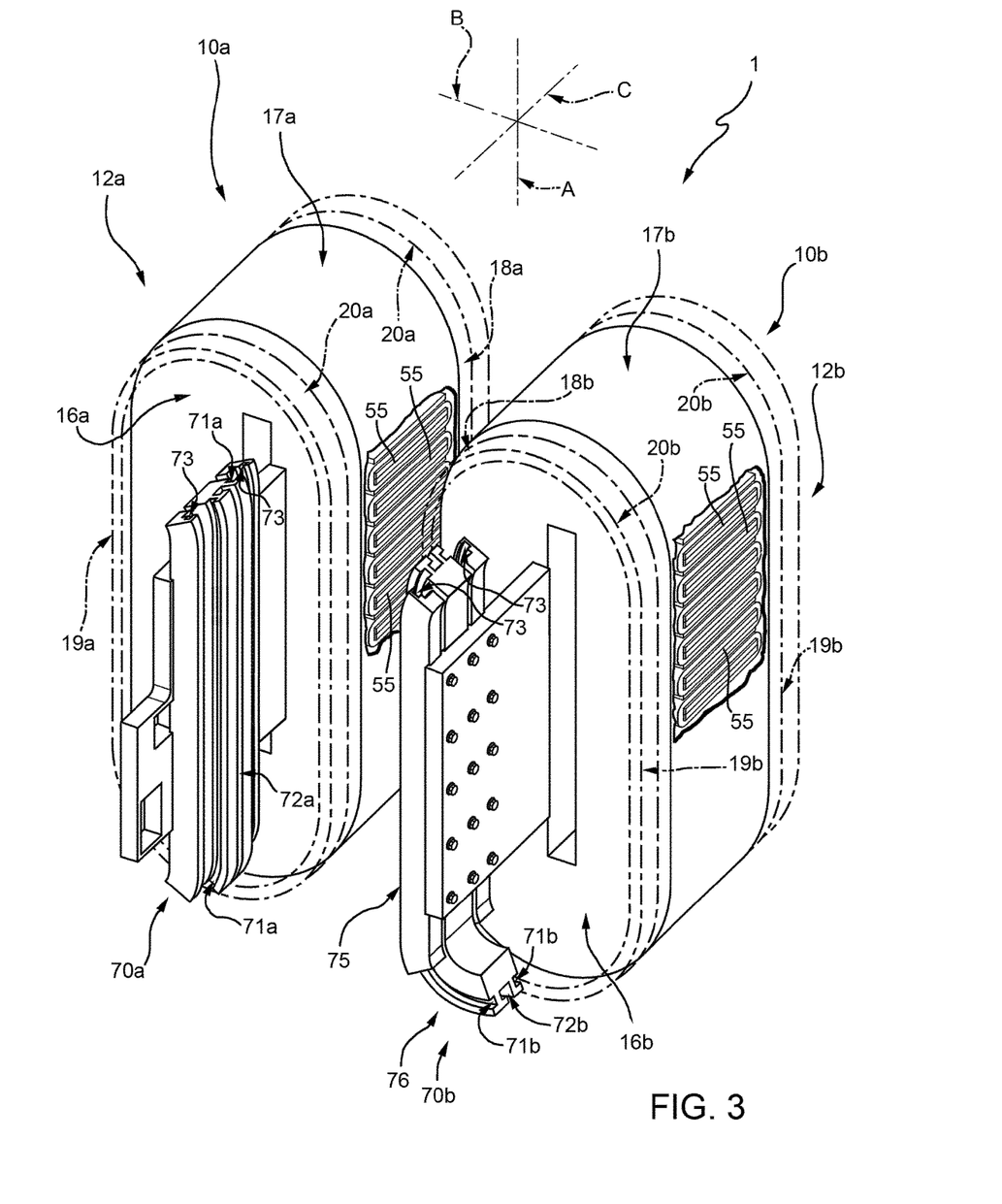
FIG. 3 shows in an enlarged perspective view of further components of the packaging unit of FIG. 1, with parts removed for clarity.

With particular reference to FIGS. 1 and 5, half-shells 21a', 21b'; 21a, 21b, counter-sealing elements 22a and sealing elements 22b are driven by respective carriages 14a' 14b'; 14a, 14b; 15a 15b along a cyclic endless path P, Q.

In particular, carriage 14a', 14b' is arranged upstream of carriage 15a, 15b and carriage 15a, 15b is arranged upstream of carriage 14a, 14b, proceeding along path P, Q according to the advancing direction of carriages 14a', 14b'; 15a, 15b; 14a, 14b.

Path P, Q comprises, proceeding along the advancing direction of carriages 14a', 14a; 14b', 14b; 15a, 15b (shown in FIG. 1):
an operative branch P1, Q1, along which half-shells 21a', 21b'; 21a, 21b, counter-sealing elements 22a and sealing elements 22b downwardly move parallel to axis A and are arranged on respective opposite sides of tube 2; and
a return branch P2, Q2, along which half-shells 21a', 21b'; 21a, 21b, counter-sealing elements 22a and sealing elements 22b subsequently move away from axis A, upwardly move parallel to axis A on the opposite side of tube 2, and moves back towards axis A.

In greater detail, half-shells 21a', 21b'; 21a, 21b, counter-sealing elements 22a and sealing elements 22b are driven along operative branch P1, Q1, as respective carriages 14a', 14b'; 14a, 14b; 15a, 15b move along respective rectilinear portion 18a, 18b of relative tracks 13a, 13b.

Counter-sealing elements 22a and sealing elements 22b are driven along return branch P2, Q2, as respective carriages 15a, 15b move along respective rectilinear portion 19a, 19b and curved portions 20a, 20b of relative tracks 13a, 13b.

When they are driven by respective carriages 14a', 14a, 14b', 14b along respective operative branch P1, Q1 of path P, Q, half-shell 21a', 21b' are arranged above counter-sealing element 22a and sealing element 22b and above respective half-shell 21a, 21b.

Furthermore, counter-sealing element 22a and sealing element 22b are arranged above respective half-shell 21a, 21b.

When they are driven by respective carriages 14a', 14b'; 14a, 14b along respective operative branch P1, Q1 of path P, Q, half-shells 21a', 21b'; 21a, 21b, counter-sealing elements 22a and sealing elements 22b are cyclically moved back and forth parallel to direction B (FIG. 5) and between:
respective closed positions, in which they cooperate with tube 2 during the formation of packs 3 and with formed packs 3 after the formation thereof; and
respective open positions, in which they are detached from tube 2.

In other words, the movement of half-shells 21a', 21b'; 21a, 21b and counter-sealing element 22a and sealing element 22b along direction B between the respective open positions and closed positions is superimposed to the movement along operative branch P1, Q1.

When half-shells 21a', 21b'; 21a, 21b are both in the respective closed position, they define a substantially parallelepiped cavity (FIGS. 1, 4 and 5) and accordingly control the volume of relative pack 3 in formation.

In particular, when half-shells 21a', 21b'; 21a, 21b are in respective closed positions, respective walls 28 are located on opposite sides of axis A, are parallel to each other, and cooperate with tube 2. In the closed position, flaps 29 of one half-shell 21a', 21b'; 21a, 21b cooperate with tube 2 to completely control the volume of pack 3 in formation, face flaps 29 of the other half-shells 21a', 21b'; 21a, 21b and are substantially orthogonal to respective wall 28.

On the contrary, when half-shells 21a', 21b'; 21a, 21b are in respective open positions, walls 28 are detached from tube 2 and walls 29 diverge from relative walls 28.

When counter-sealing element 22a and sealing element 22b are in the respective closed position, they heat-seal tube, so as form the transversal sealing band of pack 3.

At the same time, cutting element 23b is extracted, so as to separate the formed pack 3 from one another.

Along operative branches P1, Q1 of path P, Q:
at first, half-shells 21a', 21b' reach the respective closed positions;
then, half-shells 21a, 21b reach the respective closed positions; and
finally, counter-sealing element 22a and sealing element 22b reach the respective closed position.

Furthermore, half-shells 21a', 21b'; 21a, 21b remain in the respective closed position for a certain length parallel to axis A before corresponding counter-sealing elements 22b and sealing elements 22b reach the respective closed positions.

With particular reference to FIGS. 1 and 5, each operative branches P1, Q1 of path P, Q comprises, proceeding according to the advancing direction of carriages 14a', 14b'; 15a, 15b; 14a, 15a:
a respective initial portion 31a, 31b, along which both half-shells 21a', 21b'; 21a, 21b and counter-sealing element 22a and sealing element 22b are in respective open positions;
a respective portion 30a, 30b, along which half-shell 21a, 21b are in respective closed positions while half-shells 21a', 21b' and counter-sealing element 22a and sealing element 22b remain in respective open positions;
a respective portion 32a, 32b, along which half-shells 21a, 21b remain in respective closed position, half-shells 21a', 21b' are in respective closed position, and counter-sealing element 22a and sealing element 22b are still in respective open positions;
a respective portion 33a, 33b, along which both half-shells 21a, 21b, both half-shells 21a', 21b' and sealing element 22b and counter-sealing element 22a are in respective closed positions; and
a respective end portion 34a, 34b, along which half-shell 21a is in the respective open position while half-shell 21b is in the respective closed position and counter-sealing element 22a and sealing element 22b are in respective open positions.

Along portions 30a, 30b and portions 31a, 31b, tube 2 is constrained by half-shells 21a, 21b while counter-sealing element 22a and sealing element 22b are still in respective open positions. Accordingly, half-shells 21a', 21b' can be controlled to move along relative portion P1, Q1 towards half-shell 21a, 21b so as to complete the folding of pack 3 before the latter is sealed by counter-sealing element 22a and sealing element 22b.

Along portions 33a, 33b, sealing element 22b and counter-sealing element 22a reach the respective closed positions, in which they heat seal tube 2 and form transversal sealing band of pack 3. In the meanwhile, half-shells 21a', 21b'; 21a, 21b cooperate with respective pack 3 in formation, so as to control the volume of that respective pack 3 and cutting element 23b is extracted to cut formed pack 3 along the transversal sealing band.

Furthermore, return branch P2 comprises, proceeding according to the advancing direction of carriages 14a, 15a, a portion 35a, which is immediately adjacent to portion 34a and along which half-shell 21a', 21a and counter-sealing element 22a are in respective open positions.

Furthermore, return branch Q2 comprises, proceeding according to the advancing direction of carriages 14b, 14b', a portion 35b, which is immediately adjacent to portion 34b, and along which half-shell 21b', 21b are in the closed position and firmly grip formed pack 3 and counter-sealing element 22b is in the open position.

Portion 35b comprises an end 36b, which is opposite to operative branch Q1, according to the advancing direction of carriages 14a', 14b', 14a, 14b.

At end 36b, half-shell 21b moves back in the open position, so as to release formed pack 3 on conveyor 11.

Portion 35b is superimposed to outlet conveyor 11, proceeding along axis A.

Portion 35b is, at end 36b, tangential to direction B and to conveyor 11, so as to smoothly release formed pack 3 on conveyor 11 tangentially to direction B and same conveyor 11.

Carriage 14a', 14b'; 14a, 14b substantially comprises (FIGS. 2, 4 and 6):
a motor element 40, which extends parallel to direction C;
an arm 41, which protrudes laterally on one side of element 40 and is firmly fixed to element 40;
a plate 42 which is movable along direction B with respect to arm 41 along guides 43; and
a plate 44 which is movable with respect to plate 42 parallel to direction B and along guides (not shown).

Motor element 40 comprises a bar, which is provided at opposite axial ends thereof, with a pair of wheels 39, which roll inside relative endless slots defined by relative tracks 13a, 13b.

In the embodiment shown, wheels 39 rotate about relative axes thereof parallel to direction C.

Motor element 40 is, in the embodiment shown, magnetically coupled with magnetic field sources 55 (FIGS. 3 and 6) which are carried in fixed position by respective surfaces 17a, 17b, so that carriage 14a', 14b'; 14a, 14b is self-movable along tracks 13a, 13b.

Figure 4:
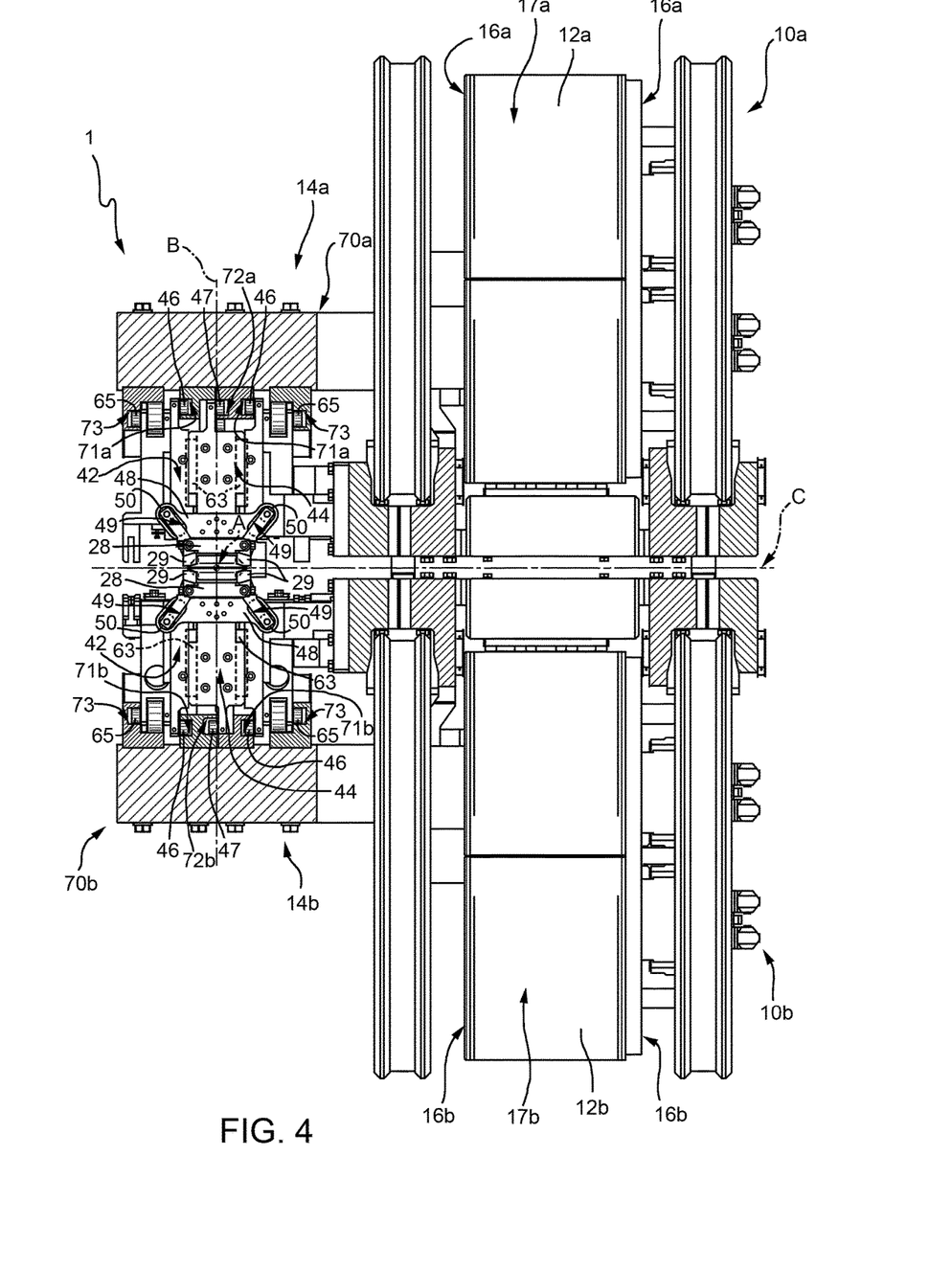
FIG. 4 is a top view of the packaging unit of FIGS. 1 to 3, with parts removed for clarity.

Plate 42 is fixed, on one side thereof, to wall 28 of half-shell 21a', 21b'; 21a, 21b and comprises, on the opposite side, a pair of rollers 46 (FIG. 4).

Plate 44 comprises, on the side of rollers 46, a roller 47 and is fixed, on the side of half-shell 21a', 21b', 21a, 21b, to a cross-bar 48.

Roller 47 is interposed between rollers 46 along direction C.

Rollers 46 and roller 47 roll about relative axes thereof parallel to direction C.

Cross-bar 48 is parallel to arm 41 and defines a pair of opposite slots 49 (FIG. 4) inclined with respect to arm 41.

Slots 49 are slidably engaged by relative rollers 50 connected to respective flaps 29 of half-shells 21a', 21b'; 21a, 21b.

Carriage 15a, 15b substantially comprises (FIGS. 2 and 6):
- a motor element 60, which extends parallel to direction C;
- an arm 61, which protrudes laterally on one side of element 60 and is firmly fixed to element 60;
- a plate 62, which is movable along direction B with respect to arm 61 along guides 63 and supports relative sealing element 22b or counter-sealing element 22a on the side of axis A and, therefore, of tube 2.

Motor element 60 comprises a bar, which is provided at opposite axial ends thereof, with a pair of wheels 64 which roll inside relative endless slots defined by relative tracks 13a, 13b.

In the embodiment shown, wheels 64 rotate about relative axes thereof parallel to direction C.

Motor element 60 is, in the embodiment shown, magnetically coupled with magnetic field sources 55 (FIGS. 3 and 6) which are carried in fixed position by respective surfaces 17a, 17b, so that carriage 15a, 15b is self-movable along tracks 13a, 13b.

Plate 62 is fixed, on one side thereof, to sealing element 22b or counter-sealing element 22a and comprises, on the opposite side, a pair of rollers 65.

Rollers 46 and roller 47 are interposed between rollers 65 along direction C.

Each forming assembly 10a, 10b further comprises (FIGS. 2 to 4) a relative cam assembly 70a, 70b which is arranged on the opposite side of end surface 16a with respect to end surface 16b.

Each cam assembly 70a, 70b comprises:
- a pair of cam surfaces 71a, 71b in rolling contact with rollers 46 of carriages 14a', 14b'; 14a, 14b travelling along operative branches P1, Q1 of path P, Q;
- a cam surface 72a, 72b in rolling contact with rollers 47 of carriages 14a', 14b'; 14a, 14b travelling along operative branches P1, Q1 of path P, Q; and
- a pair of cam surfaces 73 which are in rolling contact with rollers 65 of carriages 15a, 15b travelling along operative branches P1, Q1 of path P, Q.

Cam surfaces 73 extend in correspondence of operative branches P1, Q1 of path P, Q.

Figure 6:
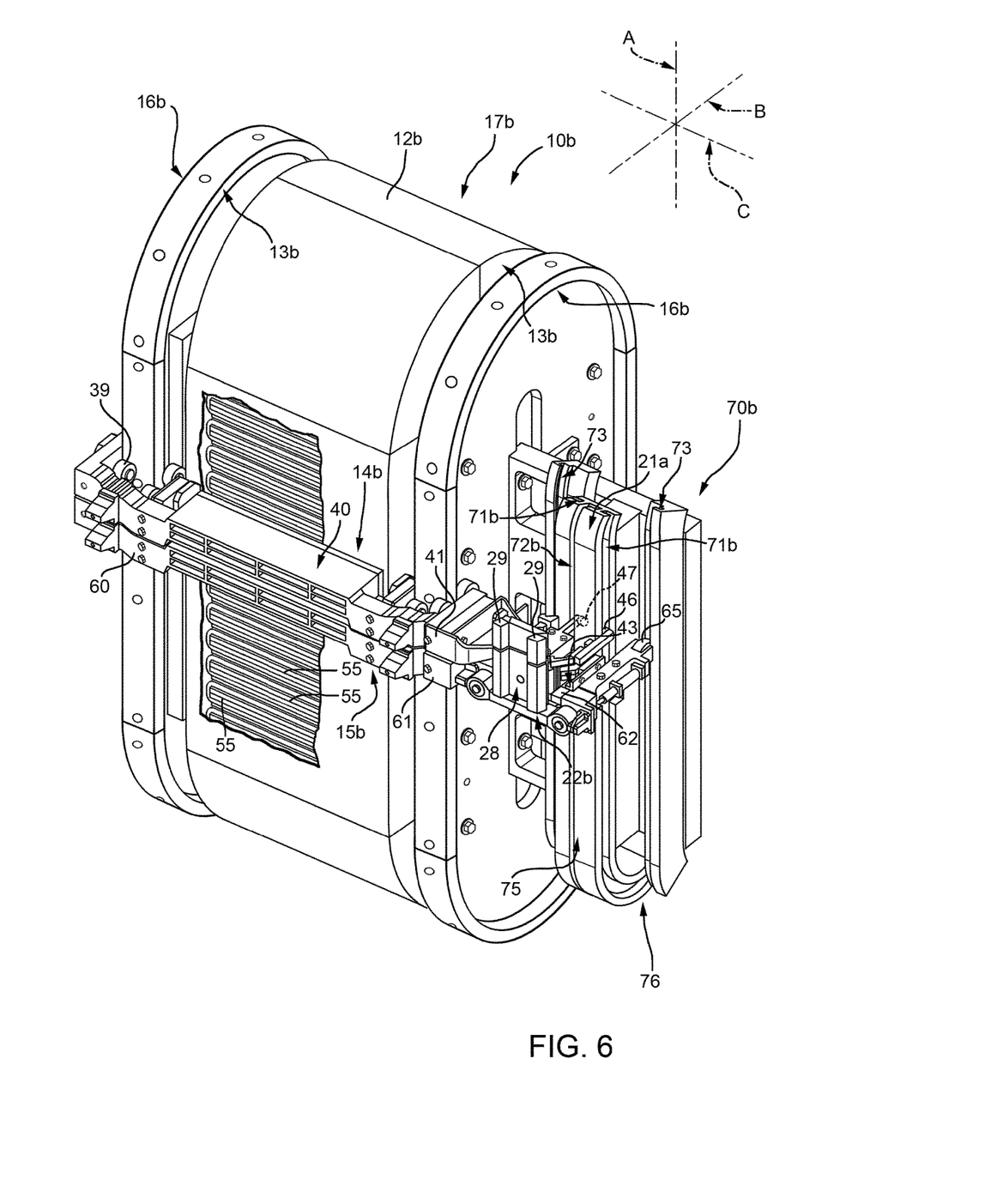
FIG. 6 is an enlarged perspective view of the forming assembly of FIGS. 1 to 5.
Figure 7:
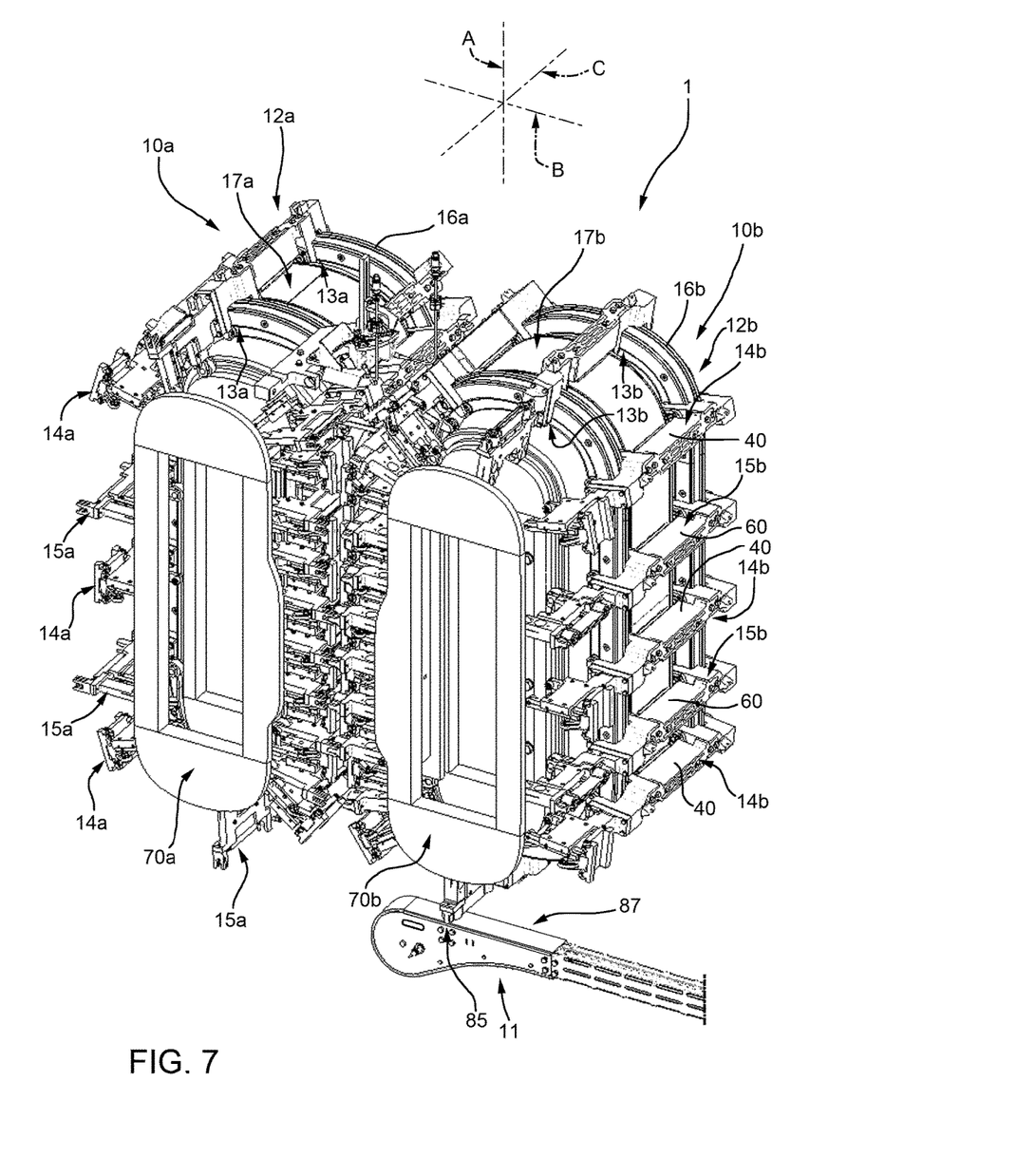
FIG. 7 is a perspective view of the packaging unit of FIGS. 1 to 6.

Cam surfaces 71a, 71b and cam surfaces 72a, 72b extend in correspondence of operative branches P1, Q1 of path P, Q and of initial portion 35b of return branch Q2 (FIG. 6).

Cam surface 72a, 72b is interposed between cam surfaces 71a, 71b.

Cam surfaces 71a, 71b and cam surfaces 72a, 72b are interposed between cam surfaces 73.

Cam surfaces 71a, 72a and cam surfaces 71b, 72b extend at different distances from axis A and are shaped in such a way that half-shells 21a', 21b'; 21a, 21b:
- remain in respective open position along respective portions 31a, 31b of operative branches P1, Q1; and
- are arranged in respective closed positions along respective portions 32a, 32b; 33a, 33b of respective operative branches P1, Q1.

Furthermore, cam surfaces 71a, 72a are shaped in such a way that half-shell 21a', 21a is arranged in the open position along portion 34a of operative branches P1.

Cam surfaces 71b, 72b comprise, in particular, (FIGS. 3 and 6):
- respective main portions 75, which have a length parallel to axis A and are shaped to keep half-shell 21b', 21b in the closed positions along portion 34b of operative branch Q1 and along initial portion 35b of return branch Q2; and
- respective end portions 76, which extend as of respective main portions 75 at increasing distances from axis A, proceeding according to the advancing direction of carriage 15a, 15b along path Q and are shaped to keep half-shell 21b in the closed positions along initial portion 35b of return branch Q2 and to displace half-shell 21b in the open position at end 36b of initial portion 35b.

Conveyor 11 comprises (FIG. 7):
- an inlet station 85, which receives, under gravity action, packs 3 which are discharged by half-shells 21b at end 36b;
- an outlet station (not-shown), which is opposite to station 85 and feeds the not-shown folding unit; and
- an operative branch 87, which extends parallel to direction B from inlet station 85 to outlet station and is tangential to portion 35b at end 36b.

In the embodiment shown, conveyor 11 is a belt conveyor.

In use, tube 2 is advanced along axis A and carriages 14a', 15a, 14a, and 14b', 15b, 14b advance independently of one another along tracks 13a, 13b, as indicated by the arrows in FIG. 1.

In particular, carriages 14a', 15a, 14a and 14b', 15b, 14b are self-movable on tracks 13a; 13b along respective paths P, Q.

The operation of unit 1 is described hereinafter with reference to only one group of carriages 14a', 14b', 14a and only one group of corresponding carriages 15a', 15b, 15a and to the only one pack 3 formed by using half-shells 21a', 21b', sealing element 22b and counter-sealing element 22a and half-shell 21a, 21b carried by respective carriages 14a', 14b', 15a, 15b; 14a, 14b.

Carriages 14a', 14b'; 15a, 15b; 14a, 14b move at first along respective return branches P2, Q2 of respective path P, Q and then along respective operative branches P1, Q1 of respective paths P, Q.

As carriages 14a', 14b'; 14a, 14b move along operative branches P1, Q1, respective half-shells 21a', 21b'; 21a, 21b move back and forth parallel to direction B and between the respective open positions and the respective closed positions.

In the very same way, as carriages 15a, 15b move along operative branches P1, Q1 respective and counter-sealing element 22a and sealing element 22b move back and forth parallel to direction B and between the respective open positions and the respective closed positions.

In particular, along operative branches P1, Q1, half-shell 21a', 21b' are arranged above counter-sealing element 22a and sealing element 22b, which are, in turn, arranged above half-shell 21a, 21b.

The operation of unit 1 is now described starting from a position, in which, along portions 31a, 31b, half-shells 21a', 21b'; 21a, 21b, counter-sealing element 22a and sealing element 22b are in respective open positions along respective portions 31a, 31b of respective operative branches P1, Q1.

In this situation, half-shells 21a', 21b', 21a, 21b, counter-sealing element 22a and counter-sealing element 22b are detached from tube 2. Furthermore, flaps of half-shells 21a, 21b diverge from wall 28, proceeding from the latter towards axis A.

Along portions 30a, 30b of respective operative branch P1, Q1, half-shells 21a, 21b are in respective closed position, while half-shells 21a', 21b', counter-sealing element 22a and sealing element 22b remain in respective open positions.

Along portions 32a, 32b of respective operative branches P1, Q1, half-shells 21a, 21b remain in the respective closed positions, whereas half-shells 21a', 21b' reach the respective closed position. In the meanwhile, counter-sealing element 22a and sealing element 22b remain in the respective open positions.

Furthermore, along portion 32a, 32b, tube 2 is constrained by half-shells 21a, 21b—arranged in a bottom position— and moved by half-shells 21a', 21b'—arranged in a top position—towards half-shells 21a, 21b, with sealing element 22b and counter-sealing element 22a still in the respective open positions.

Accordingly, the action of half-shells 21a', 21b' is effective in completing the folding of packs 3.

Along portions 33a, 33b of respective operative branches P1, Q1, counter-sealing element 22a and sealing element 22b are in the closed position, with half-shells 21a', 21b'; 21a, 21b still kept in the respective closed positions.

Accordingly, flaps 29 of opposite half-shells 21a', 21b'; 21a, 21b face one another and define a parallelepiped cavity, which houses a portion of tube 2 destined to form pack 3.

Sealing element 22b is activated to heat-seal tube in the desired sealing area thereof, so as to form transversal sealing band of pack 3 in the desired area with respect to the images repeatedly printed on tube 2.

During the sealing of the transversal sealing band, half-shells 21a', 21b'; 21a, 21b control the volume of pack 3.

Furthermore, cutting element 23b is extracted up to engage the seat, so as to cut the transversal sealing band of pack 3, so as to separate the latter from the remaining part of tube 2.

Along portions 34a, 34b, counter-sealing element 22a and sealing element 22b are in the respective open positions, half-shell 21a', 21a is in the open position, while half-shell 21b', 21b remains in the closed position.

As a result, formed, sealed and cut pack 3 is gripped and held by half-shell 21b.

The further movement of carriage 14b along track 13b causes the corresponding movement of half-shell 21b along initial portion 35b of path Q1.

As half-shell 21b reaches end 36b of portion 35b of Q1, it is moved from the closed position to the open position, thus releasing pack 3 tangentially to direction B on inlet station 85 of conveyor 11, which feeds pack 3 to the not-shown folding unit.

The movement of half-shells 21a', 21b'; 21a, 21b between the respective open positions and closed positions is determined by the rolling of rollers 46, 47 of carriages 14a, 14b over respective cam surfaces 71a, 71b; 72a, 72b.

This movement is described starting from the open positions of half-shells 21a', 21b'; 21a, 21b, when carriages 14a, 14b move along respective portions 31a, 31b of operative branches P1, Q1.

Due to the rolling movement of rollers 46 on cam surfaces 71a, 71b, plates 42 move towards axis A and tube 2 along respective guides 43 with respect to respective motor elements 40 and respective arms 41.

As a result, plates 42 move parallel to direction B, thus causing the displacement of the relative whole half-shells 21a', 21b'; 21a, 21b towards tube 2 up to a position in which walls 28 contact tube 2.

Then, the rolling movement of rollers 47 on relative cam surfaces 72a, 72b causes the movement of relative plates 44 with respect to corresponding plates 42 parallel to direction B, towards axis A and on not-shown guides.

As a result, slots 49 move towards axis A, causing the rotation of rollers 50 and of flaps 29 from a position in which they diverge with respect to wall 28 proceeding towards tube 2 up to reach a position, in which they are orthogonal to wall 28 and grip tube 2 or sealed pack 3.

At this stage, the half-shells 21a', 21b'; 21a, 21b are arranged in the respective closed positions.

The movement of half-shells 21a', 21b'; 21a, 21b from the respective closed position to the respective open positions is determined by the fact that at first respective plate 44 move away from respective plates 42 and slide on respective not-shown guides parallel to direction B, In this way, flaps 29 rotate back up to a position in which they diverge from respective walls 28, proceeding from walls 28 towards axis A.

The movement of half-shells 21a', 21b'; 21a, 21b is completed, thanks to the fact that plates 42 moves away from tube 2 and slide parallel to direction B along relative guides 43 with respect to relative arm 41.

These movements of half-shells 21a', 21b'; 21a, 21b towards respective closed positions are eased by not-shown springs which act on plate 42 and plate 44.

In this way, the whole half-shells 21a', 21b'; 21a, 21b are moved away from tube 2, up to reach again the respective open positions.

The movement of counter-sealing element 22a and sealing element 22b between the respective open positions and closed positions is determined by the rolling of rollers 65 of carriages 14a, 14b over respective cam surfaces 73.

That movement is described starting from the open positions of counter-sealing element 22a and sealing element 22b, when respective carriages 15a, 15b move along respective operative branches P1, Q1.

Due to the rolling of rollers 65 onto respective cam surfaces 73, plates 62 move along respective guides parallel to direction B and towards tube 2 with respect to arm 61 and motor element 60, up to contact tube 2 in the desired position for forming the transversal sealing band of pack 3.

At this stage, sealing element 22b and counter-sealing element 22a are arranged in the respective closed positions.

The movement of sealing element 22b and counter-sealing element 22a from the respective closed position to the respective open positions is determined by the fact that plates 62 move back along respective guide 63 parallel to direction B and on the opposite side of tube 2.

This movement is eased by not-shown springs, which act on plates 62.

The advantages of forming assembly 10a, 10b and the method according to the present invention will be clear from the above description.

In particular, carriages 14a', 15a'; 14b, 15b; 14a, 15a are self-movable independently of one another along relative tracks 13a, 13b.

Accordingly, forming assembly 10a, 10b can form packs 3 with a greater flexibility when compared with the solution described in FIG. 17 of WO00/64711 and discussed in the introductory part of the present description.

In particular, being carriages 14a', 15a'; 14b, 15b; 14a, 15a self-movable independently of one another, half-shells 21a, 21b—arranged below half-shells 21a', 21b'—are set in the respective closed positions along portions 30a, 30b and 32a, 32b of branches P1, Q1, whereas half-shells 21a', 21b' are in the respective open positions along portions 30a, 30b and reach the respective closed position along portions 32a, 32b of branches P1, Q1.

Due to the fact that sealing element 22b and counter-sealing element 22a remain in the respective open positions along portions 32a, 32b of branches P1, Q1, half-shells 21a', 21b' can be effectively controlled to downwardly move tube 2 towards half-shells 21a, 21b which constrain tube 2 itself.

In other word, half-shells 21a', 21b' can efficiently fold the triangular flaps of pack 3, while sealing element 22b and counter-sealing element 22a are in the respective closed positions and tube 2 is constrained by half-shells 21a, 21b set in the respective closed positions.

Furthermore, being carriage 14a, 14b; 14a', 14b' movable independently of carriage 15a, 15b, half-shells 21a', 21b' can control precisely and in a repeatable way the shape and the dimension of packs 3.

Furthermore, forming assembly 10a, 10b can be adapted to form packs 3 of different heights and with a narrow variation in the diameter, by simply replacing half-shells 21a, 21b with differently-sized half-shells and by suitably adjusting the movement of carriages 14a, 14b.

Finally, half-shells 21b are kept in respective closed position along portion 34b of portion Q2 of path Q diverging from axis A, and are displaced in respective open position at end 36b, so as to discharged packs 3 on conveyor 11.

In this way, it is ensured a higher degree of precision in the feeding of packs 3 to conveyor 11 with respect to the known solutions, which substantially rely on the gravity action.

As a matter of fact, there is substantially no longer the risk that the accidental adhesion between residues of heat-sealed packaging material affects the separation of packs 3 from one another.

Clearly, changes may be made to forming assembly 10a, 10b and the method as described and illustrated herein without, however, departing from the scope defined in the accompanying claims.

The invention claimed is:

1. A forming assembly for forming a plurality of sealed packs from a tube of packaging material, the tube extending in a direction along a tube axis, the forming assembly comprising:
   a track;
   a sealing element, the sealing element being cyclically movable along the track and configured to seal a cross-sectional portion of the tube to form a sealed end of a respective pack,
      wherein the sealing element is configured to move, at different locations along the track, between a first position and a second position, the sealing element being situated closer to the tube axis when the sealing element is in the second position than when the sealing element is in the first position, and
      wherein the sealing element is cyclically drivable along a cyclic path and, as it moves along the cyclic path, the sealing element is movable between the first position thereof and the second position thereof;
   a first shaping element including a first half-shell configured to contact and bound the tube to thereby control at least a portion of the shape of a first pack of the plurality of sealed packs during formation of the first pack, the first half-shell comprising a main wall and a pair of flaps hinged to the main wall,
      wherein the first shaping element is cyclically drivable along the cyclic path and, as it moves along the cyclic path, the first shaping element is movable between:
         a first operative position, in which the first half-shell contacts the tube so as to control the shape of the first pack; and
         a first rest position, in which the first half-shell is away from the tube, and
      wherein the first shaping element comprises:
         a driving body configured to contact the track and comprising a motor configured to drive the first shaping element along the track;
         a first driven body which protrudes from the driving body, wherein the first driven body is staggered from the track, carries the main wall of the first half-shell, and comprises a first cam follower; and
         a second driven body, which is movable with respect to the first driven body, is operatively connected to the pair of flaps, and comprises a second cam follower;
   a second shaping element, configured to contact and bound the tube to thereby control at least a portion of the shape of a second pack of the plurality of sealed packs during formation of the second pack, wherein the sealing element is located between the first shaping element and the second shaping element;
   a first cam surface, which cooperates with the first cam follower of the first shaping element, so as to move the main wall of the first half-shell towards or away from the tube; and
   a second cam surface, which cooperates with the second cam follower of the first shaping element, so as to move the pair of flaps of the first half-shell with respect to the main wall of the first half-shell,
   wherein the second shaping element is configured to move towards the first shaping element along the track so as to decrease a distance therebetween while the first shaping element and second shaping element contact the tube and while the sealing element is in the first position thereof, the movement of the second shaping element towards the first shaping element being independent of the movement of the sealing element from the first position thereof to the second position thereof,
   wherein the sealing element is configured to move from the first position thereof to the second position thereof while the first shaping element and the moved second shaping element contact the tube, so as to seal the first pack of the plurality of sealed packs, and
   wherein the first shaping element is arranged downstream of the sealing element with respect to the cyclic path, the cyclic path comprising respective operative branches having a main extension direction which is parallel to an advancing first direction of the tube, wherein the operative branch comprises:

a first portion, in which the first shaping element is in the first operative position and in which the sealing element is in the first position thereof, and a second portion, in which the first shaping element is in the first operative position and in which the sealing element is in the second position thereof, the second portion of the operative branch being arranged downstream of the first portion of the operative branch proceeding along the cyclic path, according to an advancing direction of the sealing element and the first shaping element.

2. The forming assembly of claim 1, wherein the second shaping element is cyclically movable along the track and comprises a second half-shell configured to contact and bound the tube;

the second shaping element being arranged upstream of the sealing element with respect to the cyclic path;

the second shaping element being movable along the track independently of the first shaping element and the sealing element;

the second half-shell being cyclically drivable along the cyclic path and, as the second shaping element moves along the path, the second shaping element is movable between:

a second operative position, in which the second half-shell contacts the tube, so as to control the shape of the second pack; and a second rest position, in which the second half-shell is away from the tube;

the operative branch comprising a third portion, in which the second shaping element is in the second rest position, and in which the sealing element is in the first position thereof and in which the first shaping element is in the first operative position;

the second shaping element being arranged in the second operative position along the first portion of the operative branch and the second portion of the operative branch;

the third portion of the operative branch being arranged upstream of the first portion of the operative branch, proceeding along the cyclic path along the advancing first direction.

3. The forming assembly of claim 2, wherein the path further comprises a fourth portion of the operative branch, in which the first shaping element is in the first operative position, and in which the sealing element is in the first position thereof;

the fourth portion of the cyclic path being arranged downstream of the second portion of the operative branch, proceeding along the cyclic path according to the advancing direction of the sealing element and the first shaping element;

the fourth portion of the cyclic path diverging from the advancing first direction, proceeding along the cyclic path according to the advancing direction of the sealing element and the first shaping element.

4. The forming assembly of claim 1, wherein at least a portion of the first portion of the operative branch extends in a direction parallel to the advancing first direction.

5. The forming assembly of claim 1, wherein the sealing element is movable between the first position thereof and the second position thereof in a rectilinear second direction which is orthogonal to the advancing first direction; and wherein the first shaping element is movable between the first operative position and the first rest position in a direction parallel to the rectilinear second direction.

6. The forming assembly of claim 1, wherein the sealing element comprises:

a sealing element driving body, the sealing element driving body contacting the track and comprising a motor configured to drive the sealing element along the track; and a sealing element driven body, which protrudes from the sealing element driving body and which is staggered from the track.

7. The forming assembly of claim 6, further comprising:

a third cam surface configured to engage a cam follower of the sealing element driven body, so as to displace the sealing element between the first position thereof and the second position thereof.

8. The forming assembly of claim 1, wherein the first cam surface and the second cam surface comprise:

a main portion, which is substantially parallel to the advancing first direction and which is configured to keep the first shaping element in the first operative position as the first shaping element moves along the first portion of the operative branch and the second portion of the operative branch; and a curved end portion, which extends from an end of the main portion and which is configured to keep the first shaping element in the first operative position as the first shaping element moves along the fourth portion of the cyclic path and to displace the first shaping element into the first rest position at an end of the fourth portion of the cyclic path.

9. The forming assembly of claim 1, wherein subsequent to the sealing element forming a sealed end of a respective pack, the sealed cross-sectional portion of the tube is cut in a direction transverse to the tube axis.

10. The forming assembly of claim 1, wherein the sealing element, the first shaping element, and the second shaping element are each associated with a respective carriage configured to move along the track.

11. A packaging unit for producing a plurality of sealed packs from a tube of packaging material, comprising a forming assembly according to claim 1:

the packaging unit comprising an additional forming assembly, which is configured to cooperate with the forming assembly;

the additional forming assembly comprising:

an additional track;

an additional sealing element, the additional sealing element being cyclically movable along the additional track and configured to seal a cross-sectional portion of the tube to form a sealed end of a respective pack, wherein the additional sealing element is configured to move, at different locations along the additional track, between a third position and a fourth position, the additional sealing element being situated closer to the tube axis when the additional sealing element is in the fourth position than when the additional sealing element is in the third position;

an additional first shaping element configured to contact and bound the tube to thereby cooperate with the first shaping element to control at least a portion of the shape of the first pack during the formation thereof; and an additional second shaping element which is cyclically movable along the additional track, wherein the additional second shaping element is configured to contact and bound the tube to thereby cooperate with the second shaping element to control at least a portion of the shape of the second pack during the formation thereof;
wherein the additional sealing element is located between the additional first shaping element and the additional second shaping element, and
wherein the additional sealing element is configured to move from the third position thereof to the fourth position thereof while the additional first shaping element contacts the tube and the additional second shaping element contacts the tube, so as to seal the first pack of the plurality of sealed packs.

12. The packaging unit of claim 11, further comprising a discharge conveyor arranged at an end point of the forming assembly, the discharge conveyor configured to receive the sealed packs discharged from the first shaping element.

13. A method for forming a plurality of sealed packs from a tube of packaging material, the tube extending in a direction along a tube axis, wherein the method comprises:
advancing the tube along an advancing first direction;
moving a sealing element along a track, the sealing element configured to seal a cross-sectional portion of the tube to form a sealed end of a respective pack,
wherein the sealing element is configured to move, at different locations along the track, between a first position and a second position, the sealing element being situated closer to the tube axis when the sealing element is in the second position than when the sealing element is in the first position, and
wherein the moving the sealing element along the track includes cyclically driving the sealing element along a cyclic path, the sealing element being movable between the first position thereof and the second position thereof as the sealing element moves along the cyclic path;
moving a first shaping element along the track, the first shaping element including a first half-shell configured to contact and bound the tube to thereby control at least a portion of the shape of a first pack of the plurality of sealed packs during formation of the first pack, the first half-shell comprising a main wall and a pair of flaps hinged to the main wall, wherein the sealing element is arranged upstream of the first shaping element with respect to the advancing first direction thereof along the track and wherein the first shaping element comprises:
a driving body configured to contact the track and comprising a motor configured to drive the first shaping element along the track,
a first driven body which protrudes from the driving body, wherein the first driven body is staggered from the track, carries the main wall of the first half-shell, and comprises a first cam follower, and
a second driven body, which is movable with respect to the first driven body, is operatively connected to the pair of flaps, and comprises a second cam follower,
wherein movement of the main wall of the first half-shell towards or away from the tube is effected by cooperation between the first cam follower and a first cam surface, and
wherein movement of the pair of flaps of the first half-shell with respect to the main wall is effected by cooperation between the second cam follower and a second cam surface;
moving a second shaping element along the track, the second shaping element configured to contact and bound the tube to thereby control at least a portion of the shape of a second pack of the plurality of sealed packs during formation of the second pack, wherein the sealing element is located between the first shaping element and the second shaping element;
contacting the tube with the first shaping element and the second shaping element while the sealing element is in the first position thereof, wherein the contacting of the tube includes cyclically moving the first shaping element between:
a first rest position, in which the first half-shell is away from the tube axis and
a first operative position, in which the first half-shell contacts and bounds the tube;
moving the second shaping element towards the first shaping element along the track so as to decrease a distance therebetween while the first shaping element and second shaping element contact the tube and while the sealing element remains in the first position thereof;
moving the sealing element from the first position thereof to the second position thereof while the first shaping element and the moved second shaping element contact the tube, so as to seal the first pack of the plurality of sealed packs, wherein the movement of the second shaping element towards the first shaping element is independent of the movement of the sealing element from the first position thereof to the second position thereof;
maintaining the first shaping element in the first operative position and the sealing element in the first position thereof while the first shaping element and the sealing element are positioned along a first portion of an operative branch of the cyclic path, the operative branch having a main extension direction parallel to the advancing first direction; and
maintaining the first shaping element in the first operative position and displacing the sealing element into the second position thereof while the first shaping element and the sealing element are positioned along a second portion of the operative branch, the second portion of the operative branch being arranged downstream of the first portion of the operative branch proceeding along the cyclic path, according to an advancing direction of the sealing element and the first and second shaping elements.

14. The method of claim 13,
wherein the sealing element and the first and second shaping elements are configured for independent movement along the track and wherein the moving of the second shaping element includes cyclically moving the second shaping element between:
a second rest position, in which the second shaping element is away from the tube axis, and
a second operative position, in which the second shaping element contacts and bounds the tube, the second shaping element being arranged upstream of the sealing element with respect to the advancing first direction thereof along the track;
the method further comprising:
keeping the second shaping element in the second rest position while the second shaping element is positioned along a third portion of the operative branch and moving the second shaping element into the second operative position while the second shaping element is positioned along the first portion of the operative branch; and
keeping the first shaping element in the first operative position and the sealing element in the first position thereof when the first shaping element and the sealing element are positioned along the third portion of the operative branch, the third portion of the operative branch being arranged upstream of the first portion of the operative branch proceeding along the path, according to the advancing direction of the sealing element and the first and second shaping elements.

15. The method of claim 14, wherein the keeping the first shaping element in the first operative position includes keeping the first shaping element in the first operative position while the first shaping element is positioned along a certain length of the cyclic path parallel to the advancing first direction.

16. The method of claim 15, further comprising directly receiving, on a discharge conveyor, sealed packs discharged from the first shaping element, the discharge conveyor situated in a staggered position with respect to the advancing first direction.

17. The method of claim 14, further comprising:
keeping the first shaping element in the first operative position while the first shaping element is positioned along a fourth portion of the cyclic path defined by a return branch of the cyclic path; and
displacing the first shaping element into the first rest position at an end of the fourth portion of the cyclic path opposite to the second portion of the operative branch, so as to directly discharge the formed packs in a staggered position with respect to the advancing first direction,
the fourth portion of the cyclic path being arranged downstream of the second portion of the operative branch, proceeding along the cyclic path according to the advancing direction of the sealing element and the first and second shaping elements, and
the fourth portion of the cyclic path diverging from the advancing first direction, proceeding along the cyclic path according to the advancing direction of the sealing element and the first and second shaping elements.

18. The method of claim 14, further comprising:
moving the sealing element between the first position thereof and the second position thereof in a rectilinear second direction which is orthogonal to the advancing first direction of the tube; and
moving the first shaping element between the first operative position and the first rest position in a direction parallel to the rectilinear second direction.

19. The method of claim 13, further comprising:
moving an additional sealing element along an additional track, the additional sealing element configured to seal a cross-sectional portion of the tube to form a sealed end of a respective pack, wherein the additional sealing element is configured to move, at different locations along the additional track, between a third position and a fourth position, the additional sealing element being situated closer to the tube axis when the additional sealing element is in the fourth position than when the additional sealing element is in the third position;
moving an additional first shaping element along the additional track, the additional first shaping element configured to contact and bound the tube to thereby control at least a portion of the shape of the first pack during the formation of the first pack;
moving an additional second shaping element along the additional track, the additional second shaping element configured to contact and bound the tube to thereby control at least a portion of the shape of the second pack during the formation of the second pack, wherein the additional sealing element is located between the additional first shaping element and the additional second shaping element;
contacting the tube with the additional first shaping element and the additional second shaping element while the additional sealing element is in the third position thereof;
moving the additional second shaping element towards the additional first shaping element along the additional track so as to decrease a distance therebetween while the additional first shaping element and additional second shaping element contact the tube and while the additional sealing element remains in the third position thereof; and
moving the additional sealing element from the third position thereof to the fourth position thereof while the additional first shaping element and the moved additional second shaping element contact the tube, so as to seal the first pack of the plurality of sealed packs, wherein the movement of the additional second shaping element towards the additional first shaping element is independent of the movement of the additional sealing element from the third position thereof to the fourth position thereof.

20. The method claim 13, wherein subsequent to the sealing the first pack and second pack, the sealed cross-sectional portion of the tube is cut in a direction transverse to the tube axis.

21. The method claim 13, wherein the sealing element, the first shaping element, and the second shaping element are each associated with a respective carriage configured to move along the track.

22. A packaging machine for forming a plurality of sealed packs from a tube of packaging material filled with a food product, wherein each sealed pack is filled with the food product and wherein the tube has an axis that extends in a vertical direction, the packaging machine comprising:
a continuous track having a linear portion extending along a side of the tube in the vertical direction, wherein the track allows controlled movement of a plurality of carriages;
a sealing carriage included as one of plurality of carriages, the sealing carriage being movable along the track and having a sealing element configured to seal a cross-sectional portion of the tube to form a sealed end of a first pack of the plurality of sealed packs,
wherein the sealing element is configured to move, at different locations along the linear portion of the track, between a first position and a second position, the sealing element being situated closer to the tube axis when the sealing element is in the second position than when the sealing element is in the first position, and
wherein the sealing element is cyclically drivable along a cyclic path and, as it moves along the cyclic path, the sealing element is movable between the first position thereof and the second position thereof;
a first shaping carriage included as one of the plurality of carriages, the first shaping carriage having a first half-shell configured to contact and bound the tube to thereby control at least a portion of the shape of the first pack of the plurality of sealed packs during formation of the first pack, the first half-shell comprising a main wall and a pair of flaps hinged to the main wall, wherein the first shaping carriage is cyclically drivable along the cyclic path and, as it moves along the cyclic path, the first shaping carriage is movable between:
- a first operative position, in which the first half-shell contacts the tube so as to control the shape of the first pack; and
- a first rest position, in which the first half-shell is away from the tube, and wherein the first shaping carriage comprises:
- a driving body configured to contact the track and comprising a motor configured to drive the first shaping carriage along the track;
- a first driven body which protrudes from the driving body, wherein the first driven body is staggered from the track, carries the main wall of the first half-shell, and comprises a first cam follower; and
- a second driven body, which is movable with respect to the first driven body, is operatively connected to the pair of flaps, and comprises a second cam follower;

a second shaping carriage included as one of the plurality of carriages, the second shaping carriage having a second half-shell configured to contact and bound the tube to thereby control at least a portion of the shape of a second pack of the plurality of sealed packs during formation of the second pack;

a first cam surface, which cooperates with the first cam follower of the first shaping carriage, so as to move the main wall of the first half-shell towards or away from the tube; and a second cam surface, which cooperates with the second cam follower of the first shaping carriage, so as to move the pair of flaps of the first half-shell with respect to the main wall of the first half-shell, wherein the first pack is formed from a first portion of the tube and the second pack is formed from a second portion of the tube, wherein the first tube portion is located below the second tube portion with respect to the vertical direction, wherein the sealing carriage is located between the first shaping carriage and the second shaping carriage with respect to the vertical direction, wherein the second shaping carriage is configured to move towards the first shaping carriage along the track so as to decrease a distance therebetween while the first half-shell and the second half-shell contact the tube and while the sealing element is in the first position thereof, the movement of the second shaping carriage towards the first shaping carriage being independent of the movement of the sealing element from the first position thereof to the second position thereof, wherein the sealing element is configured to move from the first position thereof to the second position thereof while the first half-shell and the second half-shell contact the tube, so as to seal the first pack of the plurality of sealed packs, the second half-shell having been moved towards the first half-shell along the track by the movement of the second shaping carriage towards the first shaping carriage, and wherein the first shaping carriage is arranged downstream of the sealing carriage with respect to the cyclic path, the cyclic path comprising respective operative branches having a main extension direction which is parallel to the tube axis, wherein the operative branch comprises:
- a first portion, in which the first shaping carriage is in the first operative position and in which the sealing carriage is in the first position thereof, and
- a second portion, in which the first shaping carriage is in the first operative position and in which the sealing carriage is in the second position thereof, the second portion of the operative branch being arranged downstream of the first portion of the operative branch proceeding along the cyclic path, according to an advancing direction of the sealing carriage and the first shaping carriage.

23. The packaging machine of claim 22, wherein the packaging machine further comprises a discharge conveyor situated in a staggered position with respect to the tube axis, wherein the first shaping carriage is configured to move from the first operative position into the first rest position so as to discharge a formed pack onto the discharge conveyor.

24. The packaging machine of claim 22, wherein subsequent to the sealing element forming a sealed end of the first pack of the plurality of sealed packs, the sealed cross-sectional portion of the tube is cut in a direction transverse to the tube axis.

25. The packaging machine of claim 22, wherein subsequent to the sealing element forming a sealed end of the first pack of the plurality of sealed packs, the first half-shell is configured to contact the first pack while the sealing element moves into the first position.

* * * * *